United States Patent [19]

Numata et al.

[11] Patent Number: 5,265,072
[45] Date of Patent: Nov. 23, 1993

[54] DISK STORAGE HAVING FRONT LOADING STRUCTURE

[75] Inventors: Motonobu Numata; Yasuhiro Yokote; Yoshinori Saso; Takashi Satoh, all of Atsugi, Japan

[73] Assignee: Mitsumi Electric Co., Ltd., Japan

[21] Appl. No.: 737,789

[22] Filed: Jul. 30, 1991

[30] Foreign Application Priority Data

Jan. 29, 1991 [JP] Japan ............................ 3-2441
Mar. 27, 1991 [JP] Japan ........................... 3-19054

[51] Int. Cl.⁵ .................................................. G11B 17/04
[52] U.S. Cl. ............................... 369/75.2; 369/270; 360/99.06; 360/99.07
[58] Field of Search ............... 369/75.2, 75.1, 270; 360/99.06, 99.02, 99.07

[56] References Cited

U.S. PATENT DOCUMENTS

| | | | |
|---|---|---|---|
| 4,653,039 | 3/1987 | Ueno et al. | 369/75.2 |
| 4,695,995 | 9/1987 | Koizumi | 369/75.2 |
| 4,845,700 | 7/1989 | Koizumi et al. | 369/75.2 |
| 5,119,357 | 6/1992 | Tsuruta et al. | 369/75.2 |

Primary Examiner—Paul M. Dzierzynski
Assistant Examiner—Drew A. Dunn
Attorney, Agent, or Firm—Andrus, Sceales, Starke & Sawall

[57] ABSTRACT

In a disk storage having a front loading structure, a disk tray can smoothly move between a first position and a second position. The disk tray has a tray panel with a surface corresponding to an opening of a storage body. Since the surface is larger than the opening, this disk storage has a dustproof function superior to the conventional one. In addition, since an elastic member is provided generally around the opening, the tray panel will not get damaged even when the tray panel encloses the opening. The storage body may comprise cooling means for preventing the rising of the internal temperature thereof, so that malfunctioning of the parts can be prevented and the life of each part can be extended. The elastic member may comprise a sponge.

17 Claims, 8 Drawing Sheets

DISK STORAGE HAVING FRONT LOADING STRUCTURE

BACKGROUND OF THE INVENTION

The present invention relates generally to disk storages, and more particularly to a disk storage having a front loading structure. The term "a front loading structure", as used herein, means a structure in which a disk is inserted and loaded in a storage body via a front surface of the storage body.

Figure 1A:
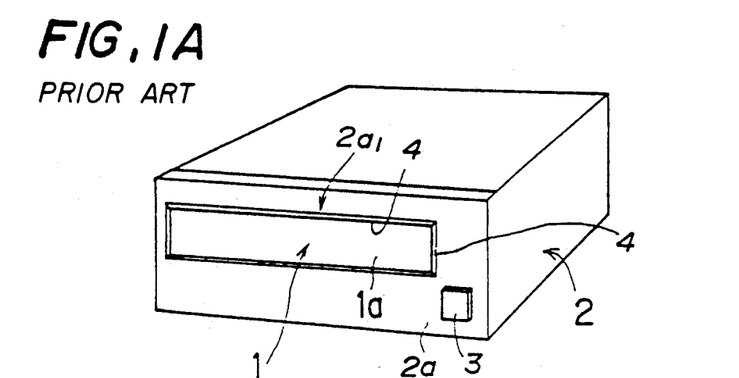
FIG. 1A shows a perspective view of a conventional optical disk storage in which a disk tray is located at a first position.
Figure 1B:
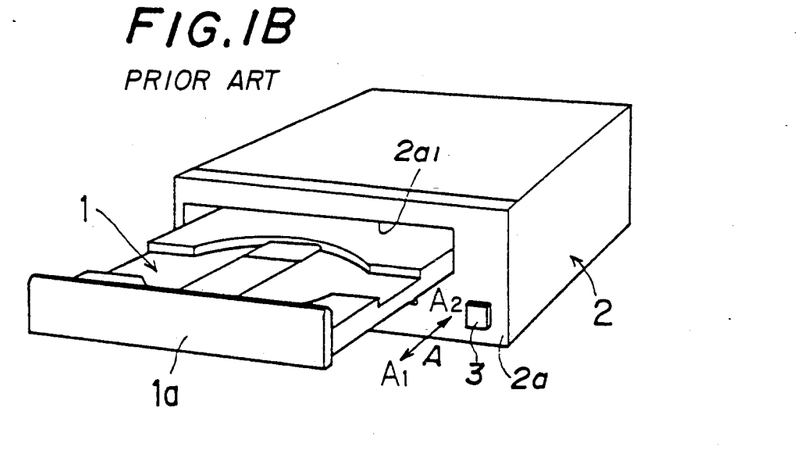
FIG. 1B shows a perspective view of the disk storage shown in FIG. 1A in which a disk tray is located at a second position.

The conventional optical disk storage comprises, as shown in FIGS. 1A and 1B, a disk tray 1 and a storage body 2. Since this disk storage has the front loading structure, the optical disk is moved in a direction $A_2$ with respect to a front surface $2a$ of the storage body 2 to be loaded therein. The disk tray 1 slides between a first position shown in FIG. 1A and a second position shown in FIG. 1B in a direction A. When the disk tray 1 is located at the first position, the optical disk is loaded in the storage body 2 and the information is recorded thereon and reproduced therefrom by the storage body 2. On the other hand, when the disk tray 1 is located at the second position, the optical disk is positioned on and/or ejected from a disk table of the disk tray 1. The disk tray 1 slides through an opening $2a_1$ in the front surface $2a$ in the direction A via a load/eject button mounted on the front surface $2a$. When the disk tray 1 is located at the first position, as shown in FIG. 1A, there is an aperture 4 between a front panel $1a$ and the opening $2a_1$. Incidentally, the storage body 2 is enclosed so as to prevent dust from entering therein.

However, the above conventional optical disk storage has disadvantages. That is, dust enters via the aperture 4 into the storage body 2, and thus the optical disk gets damaged, an internal circuit is shorted out and/or the life of each part becomes shortened. On the other hand, since the aperture 4 is an idle space necessary for the disk tray 1 to smoothly slide through the opening $2a_1$, the aperture 4 cannot be removed or even made smaller.

SUMMARY OF THE INVENTION

Accordingly, it is a general object of the present invention to provide a novel and useful disk storage in which the above disadvantages are eliminated.

Another object of the present invention is to provide a disk storage having a dustproof function superior to a conventional disk storage.

Still another object of the present invention is to provide a disk storage which prevents dust more effectively than a conventional disk storage and which prevents a rise of an internal temperature.

The more specific object of the present invention is to provide a disk storage which comprises a disk tray, movable between a first position and a second position, the disk tray comprising a tray panel with a first surface, a second surface smaller than the first surface and to be engaged with the first surface, and a third surface on/from which a disk is positioned/ejected when the disk tray is located at the second position; a body, engaged with the disk tray, the body comprising a fourth surface with an opening through which the disk tray moves between the first position and second position, the opening being sized so that the opening can be closed by the first surface of the tray panel when the disk tray is located at the first position and the disk tray can smoothly move between the first and second positions; and recording/reproducing means for recording/reproducing information on/from the disk when the disk tray is located at the first position, and an elastic member, provided between the first surface of the tray panel and the fourth surface of the body, which is pressed by the first surface so that the opening of the body can be closed by the first surface when the disk tray is located at the first position. Incidentally, the body may further comprise cooling means for preventing the rise of the internal temperature of the body.

According to the present invention, the disk tray can move as smoothly as the conventional one. In addition, since the first surface of the disk tray encloses the opening by pressing the elastic member, the disk storage having a dustproof function superior to a conventional one can be provided. The elastic member prevents the tray panel from getting damaged when the tray panel encloses the opening. Moreover, due to the cooling means, even when the body is enclosed, the malfunction and the short life of each part of the disk storage caused by the rise of the internal temperature thereof can be prevented.

Other objects and further features of the present invention will become apparent from the following detailed description when read in conjunction with the accompanying drawings.

DESCRIPTION OF THE PREFERRED EMBODIMENTS

Figure 2:
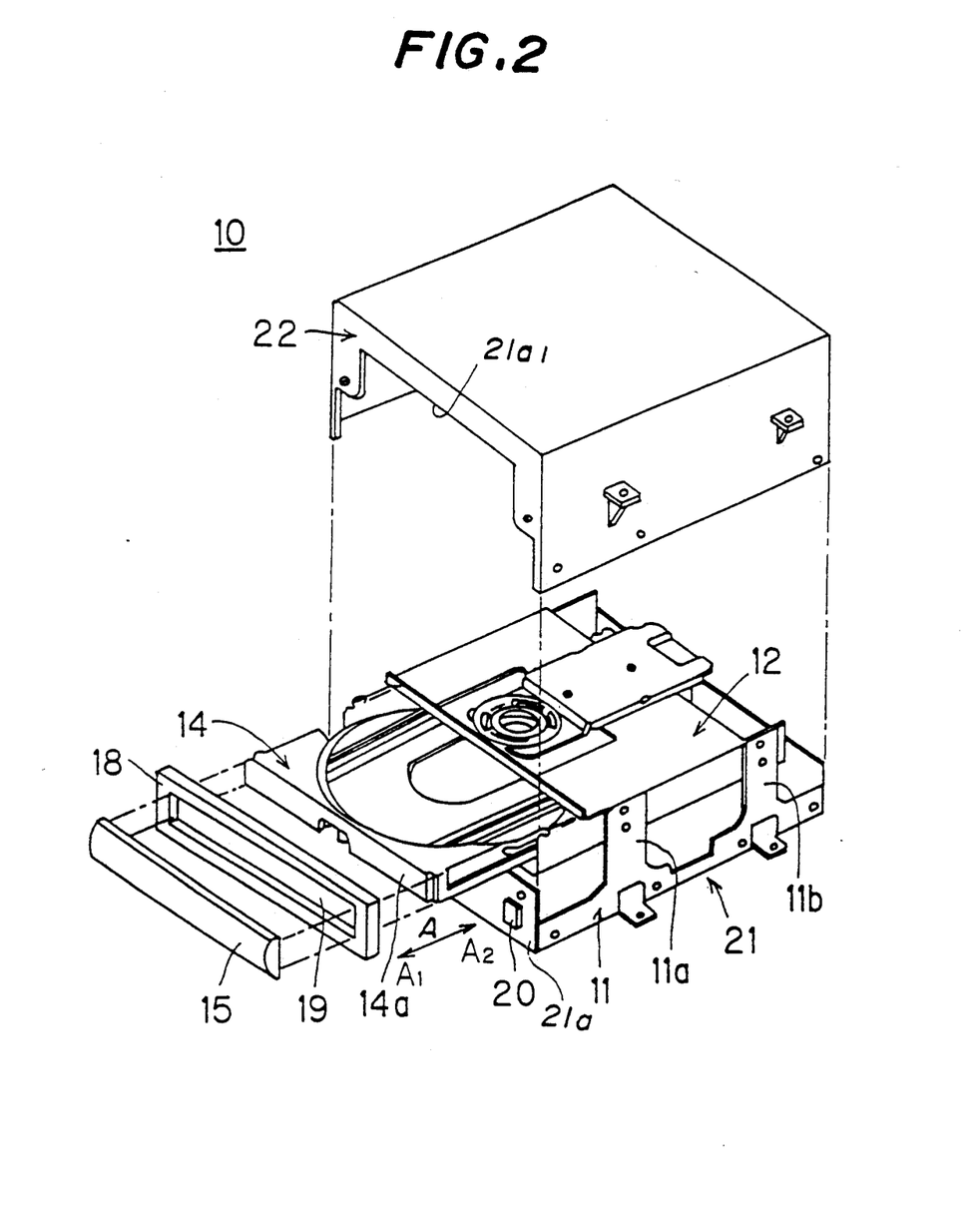
FIG. 2 shows a disassembled perspective view of an optical disk storage of a first embodiment according to the present invention.
Figure 3:
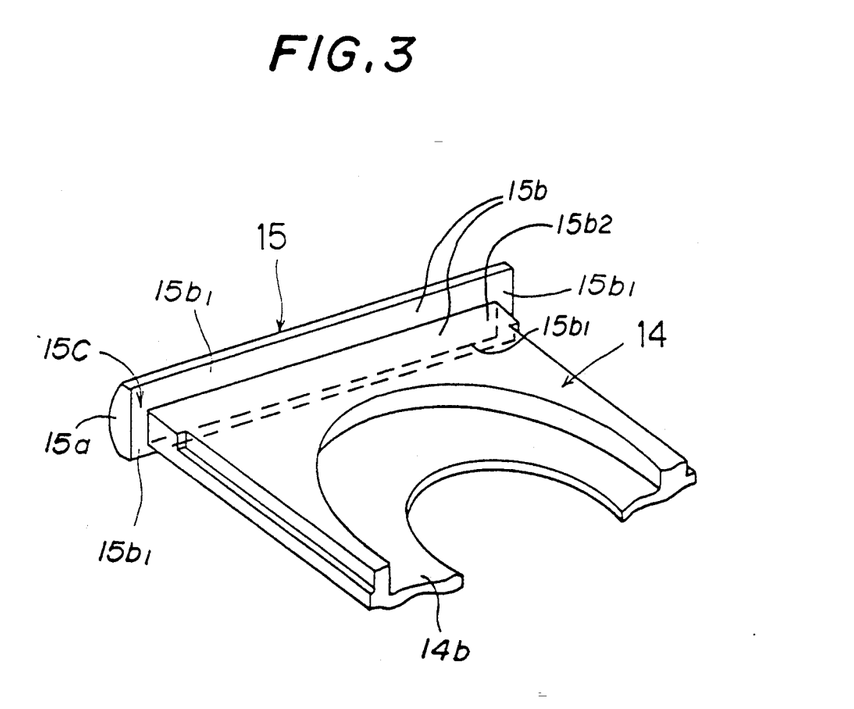
FIG. 3 shows a perspective view which illustrates an engagement between the disk tray and tray panel shown in FIG. 2.

An optical disk storage 10 of the first embodiment according to the present invention comprises, as shown in FIG. 2, a disk tray 14 and a storage body 21. The optical disk storage 10 has a front loading structure. The disk tray 14 is engaged with a tray panel 15, and the tray panel 15 encloses an opening $21a_1$ in a front surface $21a$ of the storage body 21 via a packing material 18.

Figure 4:
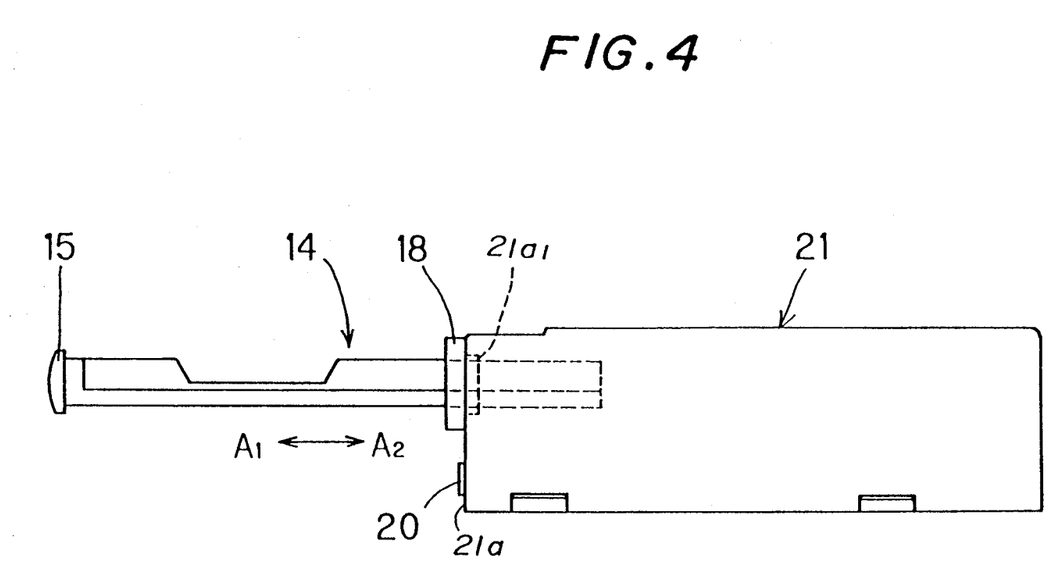
FIG. 4 shows a side view of the disk storage shown in FIG. 2 in which the disk tray is located at the second position.
Figure 5:
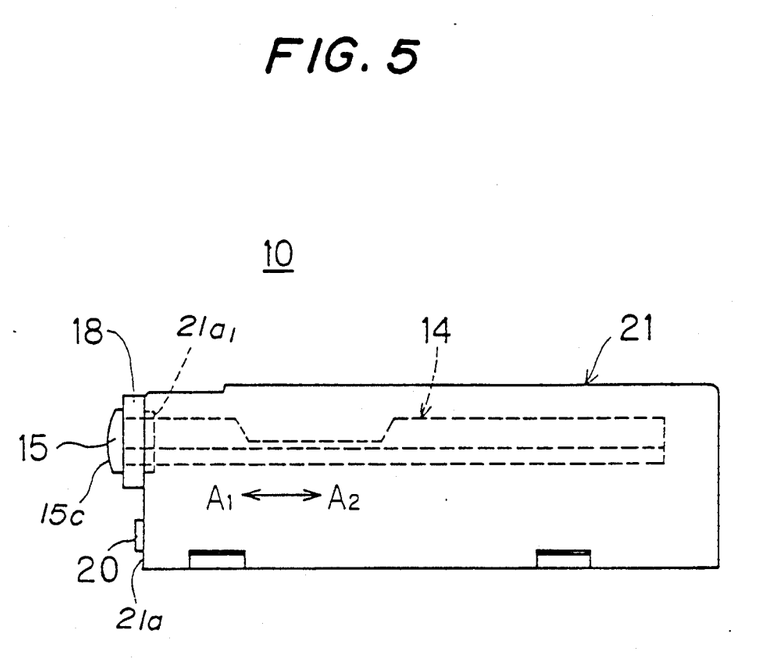
FIG. 5 shows a side view of the disk storage shown in FIG. 2 in which the disk tray is located at the first position.

The disk tray 14 moves between a first position shown in FIG. 5 at which an optical disk is loaded and a second position shown in FIG. 4 at which the optical disk is positioned on and/or ejected from a disk table of a disk tray 14. The disk tray 14 is slid in a direction A by a driving motor (not shown). The disk tray 14 has a disk table 14b having a surface on which the optical disk is placed and the tray passes through the opening $21a_1$. The surface on which the optical disk is placed may be defined herein as a "third surface" of the optical disk storage. The disk tray 14 moves between the first position and second position in response to the pushing of a load/eject button 20. Since the opening $21a_1$ is larger than a front surface 14a of the disk tray 14, the disk tray 14 can slide smoothly through the opening $21a_1$. The front surface 14a may be described herein as a "second surface". Incidentally, the size the opening $21a_1$ has to be for the disk tray 14 to smoothly slide through the opening $21a_1$ can be discovered through experiments.

The tray panel 15 comprises, as shown in FIGS. 2 to 5, an approximately cycloidal section 15a, a rectangular surface 15b and a front panel 15c. The surface 15b may be described herein as a "first surface". The tray panel 15 engages with the disk tray 14 via the front surface 14a and the rectangular surface 15b. Since the rectangular surface 15b is broader than the front surface 14a, a brim $15b_1$ is formed when the front surface 14a of the disk tray 14 is fixed to a surface positioned in the center of the rectangular surface 15b. The brim $15b_1$ may be described herein as a "sixth surface" and the surface surrounded by brim $15b_1$ and to which the front surface 14a is affixed may be termed a "fifth surface" ($15b_2$). As shown in FIG. 5, even while the disk tray 14 is located at the first position, the front panel 15c projects from the storage body 21. Accordingly, the front panel 15c is curvedly formed, thus maintaining the appearance of the optical disk storage 10 and enhancing the safety thereof. Incidentally, the front panel 15c serves as the load/eject button, so that the disk tray 14 is slid in response to the pushing of the front panel 15c. When the disk tray 14 is located at the first position, the rectangular surface 15b encloses the opening $21a_1$ of the storage body 21.

The packing material 18 is provided, as shown in FIGS. 2 to 5, between the rectangular surface 15b of the tray panel 15 and the front surface 21a of the storage body 21. Front surface 21a may be referred to as a "fourth surface". In this embodiment, the packing material 18 is bonded around the opening $21a_1$. Incidentally, the packing material 18 may be provided on the brim $15b_1$ of the tray panel 15. The packing material 18 has an opening 18a. The opening 18a has a rectangular shape and is approximately as broad as the opening $21a_1$ and narrower than the rectangular surface 15b. Therefore, the disk tray 14 can smoothly move between the first position and the second position without bumping the packing material 18. Incidentally, the packing material 18 may be approximately as broad as or broader than the tray panel 15. The packing material 1B comprises an elastic member made of a sponge or a rubber. The packing material 18 prevents the tray panel 15 from getting damaged when the tray panel 15 encloses the opening $21a_1$.

The storage body 21 comprises a frame 11, a reproducing unit 12 and a cover 22. The reproducing unit 12 is attached to attachment portions 11a to 11d of the frame 11. Incidentally, the attachment portions 11c and 11d are not shown. The frame 11 and the cover 22 are combined together by screws. The reproducing unit 12 is protected from any impact by the frame 11 and the cover 22. The reproducing unit 12 comprises a pickup, a driving mechanism for driving the pickup and a spindle motor which rotates the optical disk. When the disk tray 14 is moved to the first position, the optical disk is loaded and information recorded thereon is reproduced by the reproducing unit 12. Incidentally, the storage body 21 further comprises recording means for recording information on the optical disk when the disk tray 14 is located at the first position.

A description will now be given of the operation of the optical disk storage 10. When the disk tray 14 is located at the second position shown in FIG. 4, the optical disk is positioned on the disk table 14b thereof. In response to the pushing of the load/eject button 20, the disk tray 14 is smoothly slid in the direction $A_2$. When the disk tray 14 is moved to the first position shown in FIG. 5, the brim $15b_1$ of the tray panel 15 presses a surface of the packing material 18 facing the brim $15b_1$, which surface is termed a "seventh surface," to close the opening $21a_1$ and prevent dust from entering the storage body 2. Since the optical disk is loaded and rotated by the spindle motor, the information recorded on the optical disk can be reproduced by the reproducing unit 12. After the information is reproduced, the load/eject button 20 is pushed and the disk tray is smoothly slid from the first position to the second position. When the disk tray 14 is slid to the second position, the optical disk is ejected from the disk table 14b thereof.

Figure 6:
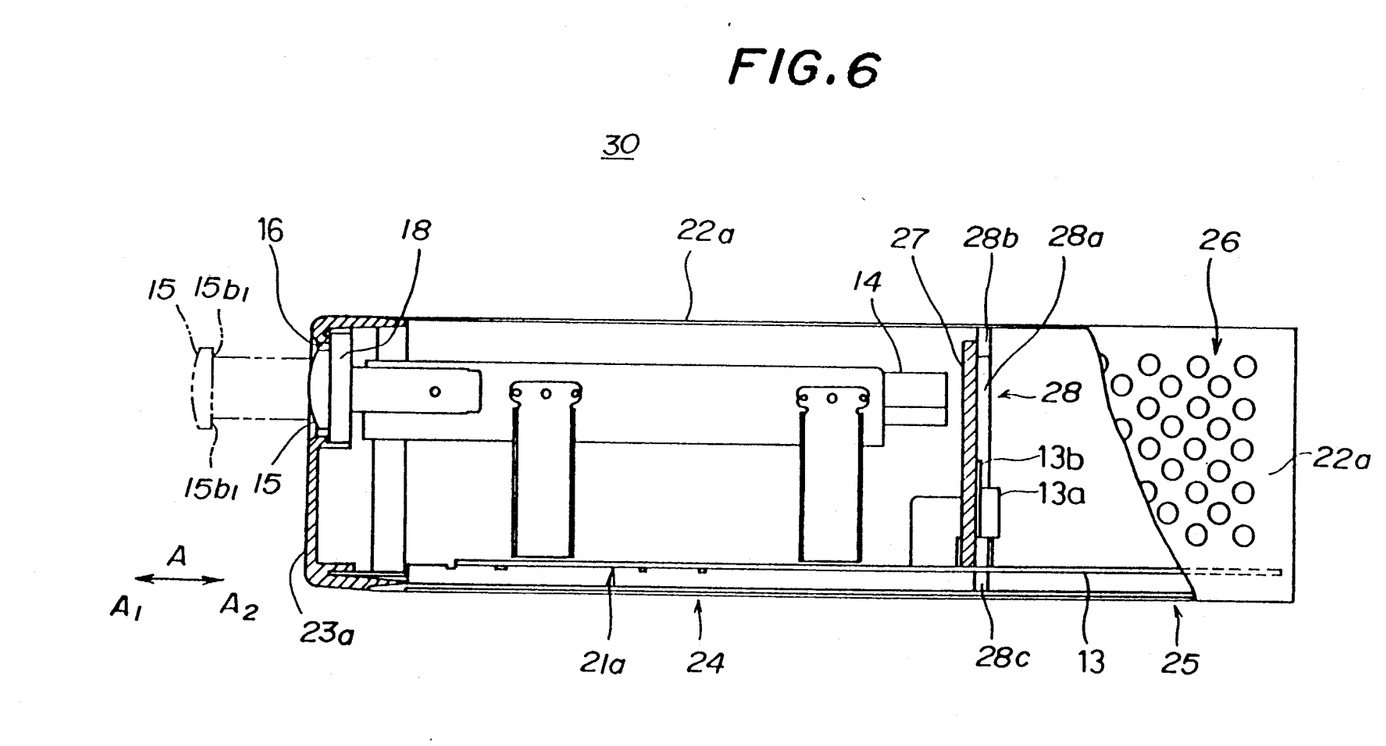
FIG. 6 shows a partially sectional side view of an optical disk storage of a second embodiment according to the present invention.
Figure 7:
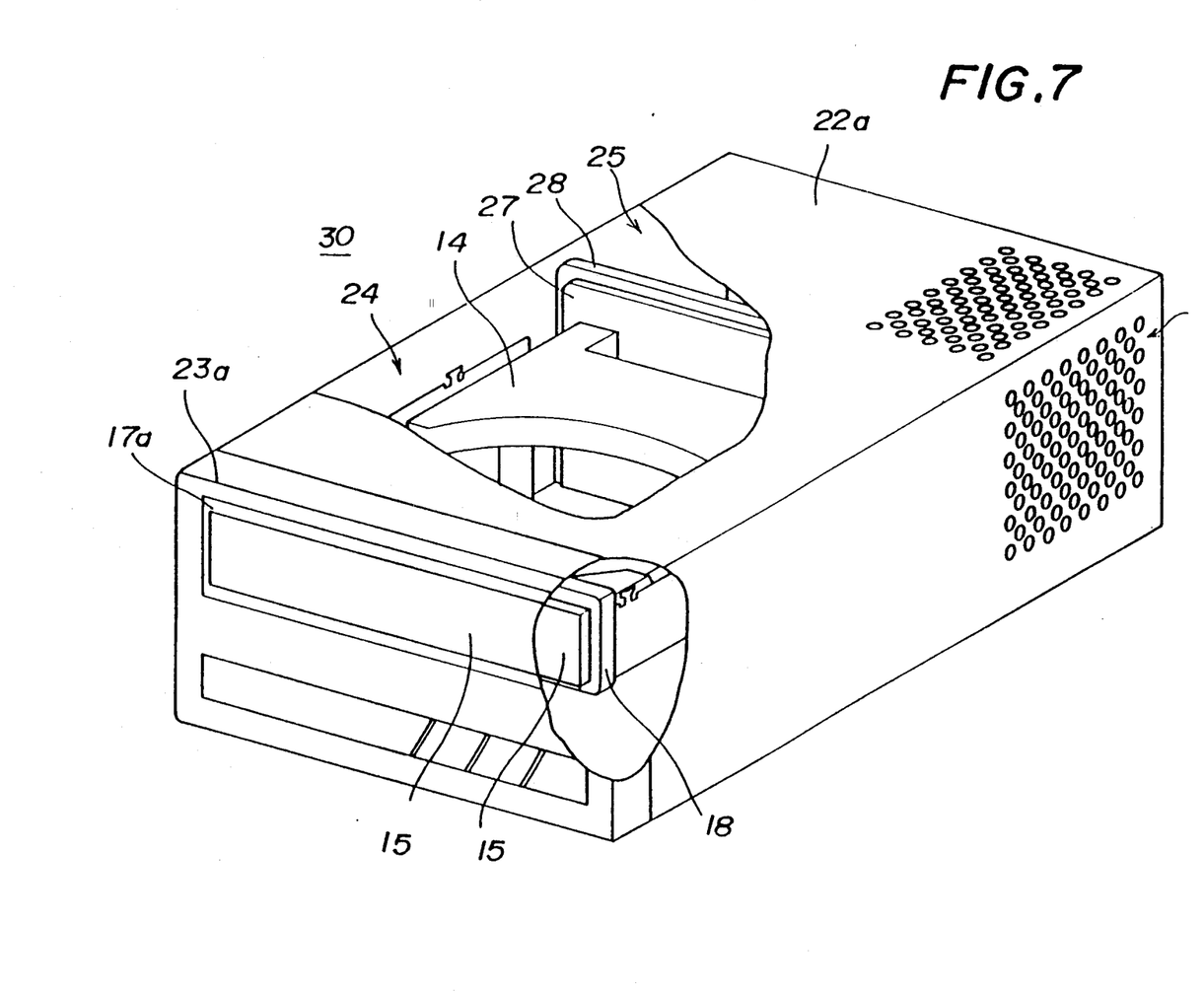
FIG. 7 shows a partially sectional perspective view of the optical disk storage shown in FIG. 6.

A description will now be given of an optical disk storage 30 of the second embodiment according to the present invention with reference to FIGS. 6 to 8. Those elements which are the same as corresponding elements in FIGS. 2 to 5 are designated by the same reference numerals, and a description thereof will be omitted. In the optical disk storage of the first embodiment, the internal temperature rises after long-term use since the storage body 21 is enclosed. The rising of the internal temperature causes the optical disk to expand, the internal circuit to malfunction, and the life of a pickup to be shortened. On the other hand, if an air hole is provided for the storage body 21, the dustproof function thereof deteriorates. Accordingly, in this embodiment, an optical disk storage which prevents dust from entering the storage body more effectively than a conventional disk storage and which prevents the rising of an internal temperature is provided. The optical disk storage of this embodiment comprises, as shown in FIGS. 6 and 7, the disk tray 14 and a storage body 23. As in the first embodiment, the disk tray 14 is combined with the tray panel 15 and the tray panel 15 encloses the opening $23a_1$ via the packing material 18.

Figure 8:
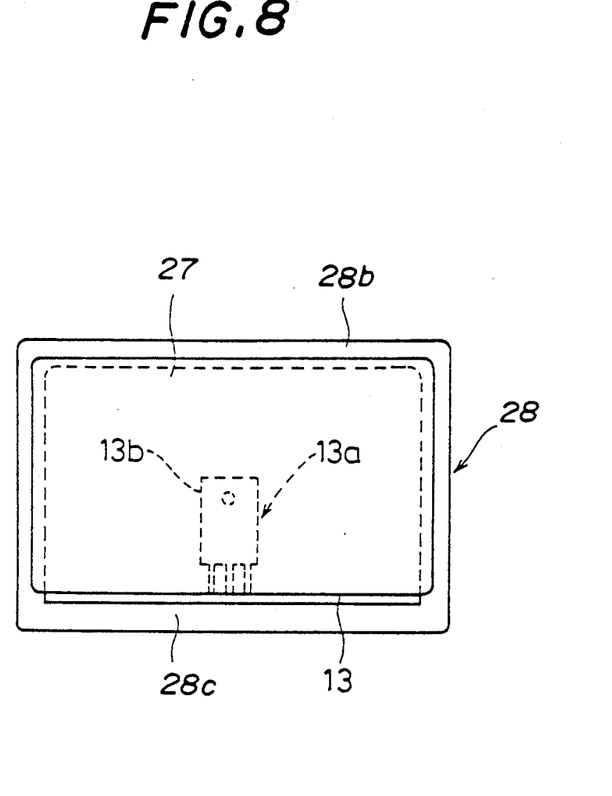
FIG. 8 shows a partial front view of the optical disk storage shown in FIG. 6.

The storage body 23 is divided, as shown in FIGS. 6 to 8, into a first room 24 and a second room 25. The first room 24 includes an opening $23a_1$, a loading mechanism, a reproducing unit 12 and circuits for controlling them. The circuits are mounted on the base 13. The second room 25 has a plurality of air holes 26. The base 13 projects into the second room 25. An aluminum plate 27 and packing material 28 are respectively provided between the first room 24 and the second room 25. As shown in FIG. 6, those mechanisms most liable to be damaged by dust are accommodated into the first room 24 and those circuits which emit a large heating value are accommodated into the second room 25.

The aluminum plate 27 functions as a cooling plate which radiates heat caused by the internal temperature in the first first room 24. Incidentally, the cooling plate can be made of material other than aluminum, as any material may be applicable as long as it has a high heat transfer coefficient. As shown in FIGS. 6 to 8, the aluminum plate 27 has a rectangular shape and is engaged with a support member 18 by screws. The support member 28 is engaged with the base 13 by screw. Thus, the aluminum plate 27 is supported approximately vertical to the base 13. The base 13 is further connected, as shown in FIGS. 6 to 8, with a power IC 13a. The power IC 13a is coupled to a cooling plate 13b. The cooling plate 13b is fixed on the aluminum plate 27 by screws. Incidentally, in addition to the power IC 13a, a switching regulator may be engaged with the aluminum plate 27.

The packing material 28 of this embodiment comprises a sponge, however an electric dustproof member may be used instead. The packing material 28 has a hollow rectangular shape when viewed from the direction A, and thus has an opening 28a. The outer rectangle of the packing material 28 is larger than the aluminum plate 27, and the inner rectangle thereof, corresponding to the opening 28a, is smaller than the aluminum plate 27. The packing material 28 is provided in the vicinity of the border of between the aluminum plate 27 and the first room 24 so that the first room can be enclosed thereby. An upper part 28b of the packing material 28 is coupled to the aluminum plate 27 and the cover 22a so as not to have any aperture. The base 13 is provided between an lower part 28c of the packing material 28 and the lower end of the aluminum plate 27. The base 13 is forced by an elastic force of the packing member 28 so that it sticks to the aluminum plate 27. Needless to say, no aperture is located between the base 13 and the packing material 28.

The second room 25 has a plurality of circular air holes 26 in the cover 22a. The number, shape and position of the air holes 26 may be changed.

Thus, even when each part of the optical disk storage 30 is actuated, heat caused by the rising of the internal temperature of the first room 24 is radiated via the cooling plate 27 and the air holes 26. In addition, since the first room 24 is protected from dust, the mechanisms can be prevented from malfunctioning and the life of each part can be extended.

Further, the present invention is not limited to these preferred embodiments, and various variations and modifications may be made thereto without departing from the scope of the present invention.

What is claimed is:

1. A disk storage comprising:
   a disk tray (14), movable between a first position and a second position, comprising:
   a tray panel with a first surface (15b)
   a second surface (14a) smaller than the first surface and engaged with the first surface, and
   a third surface on/from which a disk is positioned/ejected when said disk tray is located at the second position,
   a body, engaged with said disk tray, comprising:
   a fourth surface (21a) with an opening through which said disk tray moves between the first position and second position, the opening being sized so that the opening can be closed by the first surface of the tray panel when said disk tray is located at the first position and said disk tray can move between said first and second positions, and
   recording/reproducing means for recording/reproducing information on/from the disk when said disk tray is located at the first position, and
   an elastic member (18), provided between the first surface (15b) of the tray panel and the fourth surface (21a) of said body, which is pressed by the first surface (15b) so that the opening of said body can be closed by the first surface (15b) when said disk tray is located at the first position.

2. A disk storage according to claim 1, wherein the first surface (15b) of the tray panel comprises:
   a fifth surface (15b₂) provided at a center of the first surface (15b); and
   a sixth surface (15b₁), provided as a frame around the fifth surface (15b₂), and
   wherein the second surface (14a) is engaged with the fifth surface (15b₂) and said elastic member is pressed by the sixth surface (15b₁).

3. A disk storage according to claim 1, wherein said first surface (15b) has an approximately rectangular shape.

4. A disk storage according to claim 2, wherein said fifth surface (15b₂) has an approximately rectangular shape.

5. A disk storage according to claim 1, wherein the opening of said body is larger than the second surface (14a).

6. A disk storage according to claim 1, wherein said elastic member (18) is provided around the opening of said body.

7. A disk storage according to claim 2, wherein said elastic member (18) is provided on the sixth surface (15b₁) of the tray panel.

8. A disk storage according to claim 1, wherein said elastic member (18) comprises a sponge.

9. A disk storage according to claim 1, wherein said elastic member (18) has a seventh surface having a frame shape larger than the sixth surface (15b₁) of the tray panel, and said elastic member is pressed by the sixth surface (15b₁) via the seventh surface.

10. A disk storage according to claim 1, wherein the tray panel has a front panel which is a curved surface opposite to the first surface (15b) thereof.

11. A disk storage according to claim 1, wherein said body has a driving mechanism therein which moves said disk tray between the first position and the second position, and the driving mechanism moves said disk tray in response to the pushing of a front panel of the tray panel.

12. A disk storage according to claim 1, wherein said body has cooling means for preventing the rising of the internal temperature of said body.

13. A disk storage according to claim 12, wherein said cooling means comprises a cooling plate which radiates heat caused by the rising of the internal temperature of said body to the outside of the disk storage.

14. A disk storage according to claim 13, wherein the cooling plate is provided in the vicinity of the recording/reproducing means.

15. A disk storage according to claim 13, wherein said body is segmented into a first room having the opening and the recording/reproducing means, and a second room having an air hole, the cooling plate being provided between the first room and the second room, and said cooling means further comprising the air hole.

16. A disk storage according to claim 15, wherein said body further comprises a dustproof member provided in the vicinity of a border between the cooling plate and the first room so that the first room can be enclosed.

17. A disk storage according to claim 16, wherein the dustproof member comprises a sponge.

* * * * *